Feb. 8, 1955   R. CHRISTOPHERSON   2,701,434
LIFTING MEANS FOR VEGETABLE TOPPING MACHINES
Filed Feb. 24, 1951
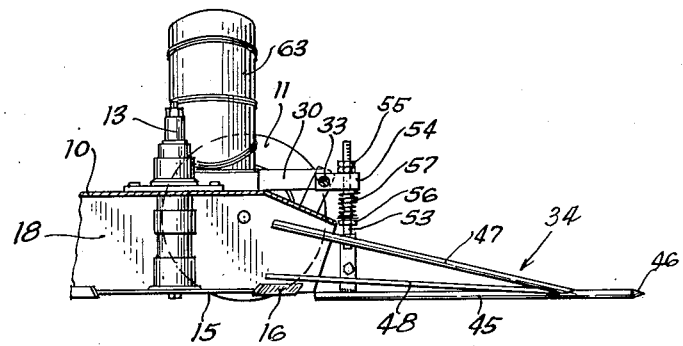
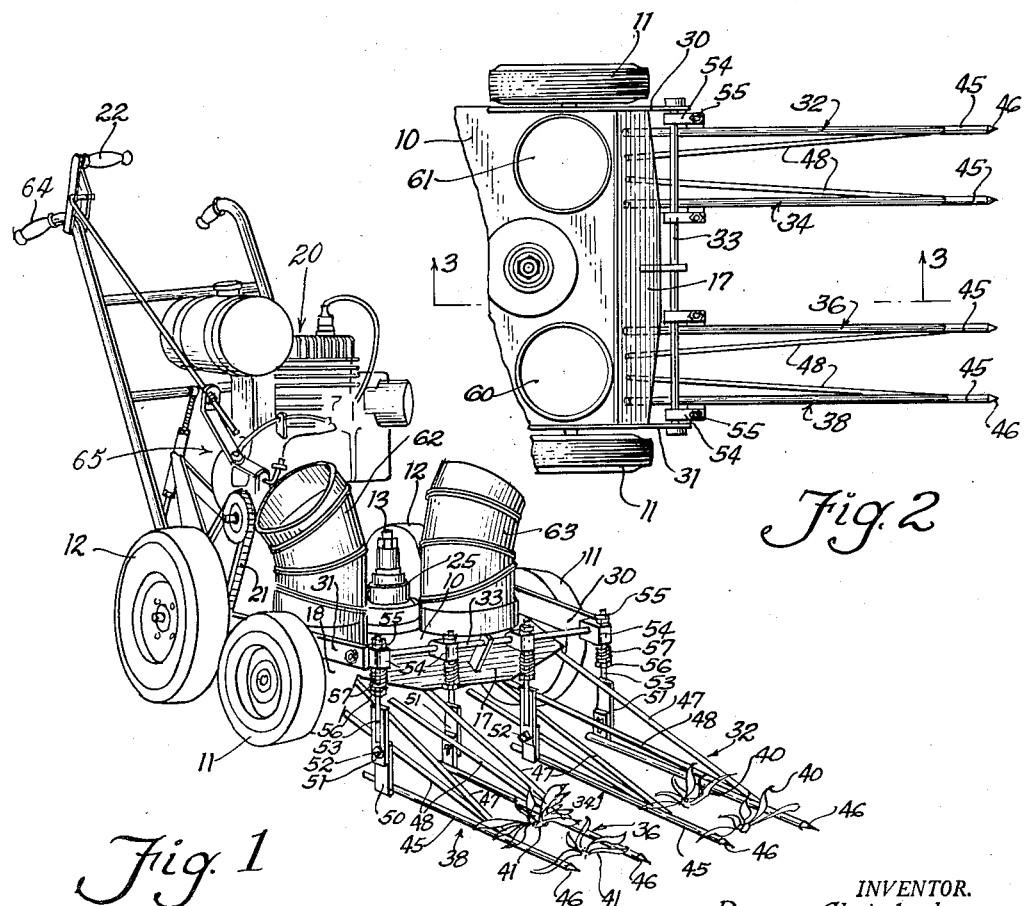
INVENTOR.
Ray Christopherson
BY
Mason, Kolehmainen, Rathburn & Wyss
Attorneys United States Patent Office 2,701,434
Patented Feb. 8, 1955

2,701,434

LIFTING MEANS FOR VEGETABLE TOPPING MACHINES

Ray Christopherson, Racine, Wis., assignor to Devere Company, Racine, Wis., a corporation of Wisconsin Application February 24, 1951, Serial No. 212,565

2 Claims. (Cl. 56—1)

The present invention relates to an improved vegetable topping machine and, more particularly, to an improved machine for cutting the tops from growing vegetables before they are removed from the ground.

It is an object of the present invention to provide a vegetable topping machine of this character which is of compact and simple construction, is reliable in operation, and includes facilities for lifting the vegetable tops into the path of the cutting blade.

It is a further object of the present invention to provide a new and improved vegetable topping machine wherein the vegetable tops are comminuted and ejected from the machine in finely divided form to remain on the land as a fertilizer.

It is a still further object of the present invention to provide a new and improved vegetable topping machine wherein the vegetable tops are comminuted and the comminuted material is sucked upwardly from the cutting zone and discharged laterally from the mower through discharge ports to remain on the land as fertilizer.

It is another object of the present invention to provide a vegetable topping machine of the above-described type having a generally improved construction and design with particular relation to the provision of adjustable means for raising the vegetable tops as they enter the cutting zone.

It is still another object of the present invention to provide a new and improved vegetable topping machine wherein the vegetable top lifting means is adjustable with respect to the ground level.

The invention, both as to its organization and method of operation, together with further objects and advantages thereof, will best be understood by reference to the following specification taken in connection with the accompanying drawings, in which:

Fig. 1 is a perspective view of a vegetable topping machine constructed in accordance with the principles of the present invention;

Fig. 2 is a plan view of the machine shown in Fig. 1 with substantially all but the forward portion cut away; and Fig. 3 is a sectional side view taken along the line 3—3 of Fig. 2.

Referring now to the drawing and more particularly to Fig. 1 thereof, the present improved vegetable topping machine is there illustrated as comprising a horizontal platform 10, which is supported for movement on front wheels 11 and rear wheels 12 and is provided with a centrally located vertically extending shaft 13 which is journalled in the platform 10 and supports at the lower end thereof a horizontal cutter blade 15 which is adapted to be rotated in a horizontal plane upon rotation of the shaft 13. The platform 10 is provided with a sloping front wall 17, a rear wall, not shown, and vertical side walls 18 so as substantially to enclose the space surrounding the horizontal cutter blade 15 and thus define a substantially confined air space open only to the ground. The cutter blade 15 is provided at either end thereof with cutting elements 16 which are provided with a forward cutting edge and are preferably tilted so as to throw the cut material upwardly. The elements 16 also act as fan blades to produce a suction within the confined cutting zone which sucks the material upwardly into the cutting zone and to produce an air stream which carries the cut material away from the cutting elements.

A gasoline motor indicated generally at 20 is provided for the dual purpose of propelling the wheel supported platform 10 and rotating the enclosed cutter blade 15. To propel the machine, the drive shaft (not shown) of the motor 20 is connected through a suitable gear reduction drive mechanism (not shown) and through the drive chain 21 to at least one of the rear wheels 12, the direction of rotation of the drive chain 21 being preferably reversible from the handle 64 of the mower by means of a linkage 65 including the reversing handle 22. For example, the reversible drive mechanism described and claimed in the co-pending application of Albert Owen Hawkins, Serial No. 189,933, now Patent No. 2,634,629, which was filed on October 13, 1950, and is assigned to the same assignee of the present invention, may be employed to supply power from the motor 20 to the rear wheels 12 of the mower. Also, the motor 20 rotates the cutter blade 15 by means of a flexible belt 25 which is positioned around a pulley (not shown) supported on the shaft 13 and engages a similar pulley (not shown) on the drive shaft (not shown) of the motor. The tension of the belt 25 may be adjusted by means of a cutter throwout mechanism (not shown) to stop rotation of the horizontal cutter blade 15 during periods when no cutting action is required.

From the foregoing general explanation, it will be evident that rotation of the cutter 15 causes the blade elements 16 to create a suction or vacuum which sucks the vegetable tops or blades of glass or other material within the confined air space upwardly into the path of the cutting blade. In accordance with the present invention, facilities are also provided at the front end of the machine for lifting the tops of vegetables in the path of the machine as the machine is moved forwardly and for holding the raised tops in the proper positions to be sucked into the cutting zone of the machine. To support these facilities a pair of support members 30 and 31 are provided which are secured to the platform 10 at either side thereof and project forwardly from the platform. A transverse bar 33 is mounted upon and extends between the forward extremities of the supporting members 30 and 31 and serves to support a plurality of adjustable lifting shoe assemblies 32, 34, 36 and 38. The lifting shoe assemblies are grouped in pairs and the assemblies of each pair are adapted to straddle a row of vegetables. Thus, the lifting shoe assemblies 32 and 34 are adapted to straddle a first row of vegetables 40 and the lifting shoe assemblies 36 and 38 are adapted to straddle a second row of vegetables. Each of the lifting shoe assemblies comprises a bottom runner blade 45 which is adapted to engage the ground and has the forward end thereof tilted slightly upward so as to slide smoothly over the surface of the ground. Also, the tip portion 46 of each runner blade 45 is pointed so as to slide smoothly over surface obstructions. The runner blade 45 of each assembly is adapted to slide between the vegetable tops and the ground and each assembly is also equipped with a first lifting blade 47 which extends rearwardly and upwardly from the tip of the runner blade 45 at an acute angle thereto so as to slide progressively under the vegetable tops and lift the same upwardly as the machine is propelled forward. In order to prevent the tops of the vegetables from falling back to the ground after they fall off the lifting blade 47, a second lifting blade 48 is provided in each assembly to extend upwardly, rearwardly and inwardly from the tip of the runner blade 45 in the same assembly. In this connection it will be understood that the second lifting blade 48 of each pair of assemblies are complementary. Thus the lifting blades 48 of the lifting assemblies 32 and 34 extend inwardly toward each other to form a V-shaped lifting surface as is well illustrated in Fig. 2. The lifting blades 47 and 48 may be secured to the runner blade 45 in any suitable manner as by welding or the like, and extend rearwardly over the path of the cutter blade 15 so as to hold the vegetable tops erect until they enter the cutting zone of the cutting elements 16.

Each of the lifting shoes is adjustable laterally so that the spacing between pairs of lifting assemblies may be varied to accommodate vegetable rows having different widths. Thus, the rear end of the runner blade 45 of each assembly is secured to an upstanding support member 50 which overlaps a second vertical supporting bar 51. The members 50 and 51 may be moved vertically relative to each other to vary the position of the lifting assembly and are clamped together by means of the bolt 52. A supporting post 53 is welded to the member 51 above the bolt 52 and extends upwardly through a supporting block 54 which is positioned on the transverse supporting bar 33. The post 53 is threaded along a substantial portion of the length thereof and is adapted to receive the lock nuts 55 above the block 54 and a retaining nut 56 below the block 54, a coil spring 57 being positioned between the block 54 and the nut 56 so as to permit limited vertical movement of the lifting shoe against the biasing force of the spring 57. The blocks 54 may be adjusted laterally along the bar 33 so as to vary the spacing between the lifting shoe assemblies and the blocks may be clamped in place by any suitable means such as a set screw or the like (not shown).

From the foregoing explanation it will be evident that the lifting shoe assemblies 32, 34, 36 and 38 may be laterally adjusted throughout the length of the transverse supporting bar 33 so as to permit the grouping of the assemblies in accordance with the width of a particular vegetable row. Also vertical adjustment of the assemblies is permitted by the use of the overlapping vertical supporting members 50 and 51 and the shoes are spring-biased into engagement with the ground so that each lifting shoe may be raised by a substantial amount against the force of its biasing spring to conform to variations in the contours of the ground.

In accordance with a further important feature of the invention, the vegetable tops which are moved into the cutting zone by means of the above-described lifting shoe assemblies are finely comminuted by the cutting elements 16 as the same rotate at high speed. As the vegetable tops are comminuted they form a light weight chaff which is easily blown upwardly from the cutting zone by the air stream created by the blade elements 16, and in its finely divided state is suitable for depositing on the land where it may remain as fertilizer. To exhaust the chaff-like comminuted vegetable tops, openings 60 and 61 are provided in the platform 10 and a pair of L-shaped conduits 62 and 63, which are positioned over the openings 60 and 61 and open generally laterally of the machine, serve as discharge ports whereby the vegetable top chaff is blown upwardly from the cutting zone and through the conduits 62 and 63 and is discharged laterally from the machine to fertilize the land on both sides of the mower.

The vegetable topping machine of the present invention has been illustrated in connection with a horizontal rotary cutter blade machine which may also be used as a power driven lawn mower and provides a convenient attachment for converting a conventional power driven lawn mower into a vegetable topping machine. However, it will be understood that the lifting and exhausting means described above may be employed in any suitable rotary cutter blade machine wherein a suction type cutting blade is operated in a substantially enclosed cutting zone so that the finely divided cut material may be exhausted from the machine in the manner described above. Furthermore, the machine may be propelled by hand if so desired.

From the foregoing it will be apparent that the present invention provides a vegetable topping machine wherein vegetable tops which are lying on the ground are picked up by means of lifting shoe assemblies and are held substantially erect until they enter a cutting zone wherein they are comminuted into chaff and the chaff is blown upwardly away from the cutting zone and is exhausted back to the land to serve as a fertilizer. The lifting shoe assemblies are conveniently adjustable both laterally and vertically so as to permit adjustment thereof to vegetable rows of different widths and to conform to changes in elevation of the ground.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. Lifting means for a vegetable topping machine of the type described, comprising a transverse supporting bar carried by the machine at the forward end thereof, and a plurality of lifting shoe assemblies positioned on said supporting bar and adapted for limited vertical movement relative thereto, each of said lifting shoe assemblies including a forwardly extending substantially horizontal runner blade, a first lifting blade extending rearwardly and upwardly from the forward portion of said runner blade in substantially the same vertical plane and at an acute angle thereto, and a second lifting blade extending rearwardly and upwardly from said forward portion of said runner blade at an acute angle thereto and extending inwardly toward an adjacent lifting shoe assembly.

2. Lifting means for a vegetable topping machine of the type described, comprising a transverse supporting bar carried by the machine at the forward end thereof, and a plurality of lifting shoe assemblies positioned on said supporting bar and adapted for limited vertical movement relative thereto, each of said lifting shoe assemblies including a forwardly extending substantially horizontal runner blade, a supporting block positioned on said transverse member and adjustable along the length thereof, a vertical supporting post movably mounted in said block and connected to the rear portion of said runner blade, a coil spring surrounding said post between said block and said runner blade for urging said runner blade downwardly, whereby the rear portion of said runner blade is continuously urged into contact with the ground despite change in the contour thereof, a first lifting blade extending rearwardly and upwardly from the forward portion of said runner blade in substantially the same vertical plane and at an acute angle thereto, and a second lifting blade extending rearwardly and upwardly from said forward portion of said runner blade at an acute angle thereto and extending inwardly toward an adjacent lifting shoe assembly.

References Cited in the file of this patent

UNITED STATES PATENTS

| Number | Name | Date |
|---|---|---|
| 852,053 | Bestgen | Apr. 30, 1907 |
| 1,336,257 | Muzzy | Apr. 6, 1920 |
| 2,154,564 | Eisenlohr | Apr. 18, 1939 |
| 2,198,526 | Cockburn | Apr. 23, 1940 |
| 2,298,121 | Grimes | Oct. 6, 1942 |
| 2,314,681 | Beatty | Mar. 23, 1943 |
| 2,510,728 | Teichman | June 6, 1950 |
| 2,539,779 | Grosso | Jan. 30, 1951 |
| 2,552,623 | Dye | May 15, 1951 |
| 2,579,013 | Sampson | Dec. 18, 1951 |